US012782779B2

(12) United States Patent
Ma et al.

(10) Patent No.: US 12,782,779 B2

(45) Date of Patent: Nov. 3, 2026

(54) GLASS WITH FUNCTION OF REGULATION IN SECTIONS INCLUDING A FUNCTIONAL COMPONENT AND A CONDUCTIVE ELEMENT, AND SYSTEM FOR REGULATING GLASS IN SECTIONS

(71) Applicant: SAINT-GOBAIN GLASS FRANCE, Courbevoie (FR)

(72) Inventors: Siteng Ma, Shanghai (CN); Lu Wang, Shanghai (CN)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 775 days.

(21) Appl. No.: 17/764,028

(22) PCT Filed: Sep. 27, 2020

(86) PCT No.: PCT/CN2020/118011

§ 371 (c)(1),
(2) Date: Mar. 25, 2022

(87) PCT Pub. No.: WO2021/057943

PCT Pub. Date: Apr. 1, 2021

(65) Prior Publication Data

US 2022/0342251 A1 Oct. 27, 2022

(30) Foreign Application Priority Data

Sep. 29, 2019 (CN) ......................... 201910930985.0

(51) Int. Cl.

*G02F 1/1343* (2006.01)
*B60J 1/00* (2006.01)

(Continued)

(52) U.S. Cl.

CPC .......... *G02F 1/13439* (2013.01); *B60J 1/001* (2013.01); *B60J 1/02* (2013.01); *B60J 1/08* (2013.01);

(Continued)

(58) Field of Classification Search

CPC ....................... G02F 2202/16; G02F 1/134309
See application file for complete search history.

(56) References Cited

U.S. PATENT DOCUMENTS 6,777,254 B1 * 8/2004 Yamazaki ........... H01L 21/0217 438/30
2005/0195488 A1 * 9/2005 McCabe ............... G02F 1/1533 359/603

(Continued)

FOREIGN PATENT DOCUMENTS

CN 204479885 U 7/2015
CN 204965392 U 1/2016

(Continued)

OTHER PUBLICATIONS

International Search Report as issued in International Patent Application No. PCT/CN2020/118011, dated Jan. 4, 2021.

(Continued)

*Primary Examiner* — Lauren Nguyen
(74) *Attorney, Agent, or Firm* — CUSHMAN PARTNERS LLC

(57) ABSTRACT

A glass with a function of regulation in sections includes a glass body and a conductive component. The glass body includes a glass substrate and a functional component attached to the glass substrate and divided into sections capable of being individually regulated. The conductive component is coupled to each section of the functional component. The conductive component includes a flexible printed circuit and a conductive adhesive. The flexible (Continued)

printed circuit includes a conductive trace electrically connected to each section of the functional component via the conductive adhesive to allow an individual regulation of each section of the functional component. The glass with a function of regulation in sections is capable of regulating a function of a target section of the functional component according to a user's instruction and an environmental parameter.

22 Claims, 8 Drawing Sheets

(51) Int. Cl.

| | |
|---|---|
| ***B60J 1/02*** | (2006.01) |
| ***B60J 1/08*** | (2006.01) |
| ***G02F 1/133*** | (2006.01) |
| ***G02F 1/1333*** | (2006.01) |
| ***G02F 1/1334*** | (2006.01) |

(52) U.S. Cl.

CPC .... *G02F 1/13306* (2013.01); *G02F 1/133302* (2021.01); *G02F 1/1334* (2013.01); *G02F 1/134309* (2013.01); *G02F 2202/16* (2013.01); *G02F 2202/28* (2013.01); *G02F 2203/01* (2013.01); *G02F 2203/48* (2013.01)

(56) References Cited

U.S. PATENT DOCUMENTS

| | | | | |
|---|---|---|---|---|
| 2017/0152702 | A1* | 6/2017 | Chang | G02F 1/1334 |
| 2018/0079379 | A1 | 3/2018 | Snider et al. | |
| 2018/0285793 | A1* | 10/2018 | Li | G06Q 10/0633 |
| 2019/0235341 | A1* | 8/2019 | Wang | G02F 1/163 |

FOREIGN PATENT DOCUMENTS

| | | | | | |
|---|---|---|---|---|---|
| CN | 205176435 | U | | 4/2016 | |
| CN | 10-6029415 | | * | 10/2016 | B60J 3/04 |
| CN | 106029415 | A | | 10/2016 | |
| CN | 107045220 | A | | 8/2017 | |
| CN | 107209409 | A | | 9/2017 | |
| CN | 206470508 | U | | 9/2017 | |
| CN | 207352315 | U | | 5/2018 | |
| CN | 108445667 | A | | 8/2018 | |
| CN | 108646495 | A | | 10/2018 | |
| CN | 108761952 | A | | 11/2018 | |
| CN | 208141081 | U | | 11/2018 | |
| CN | 109073928 | A | | 12/2018 | |
| CN | 109263446 | A | | 1/2019 | |
| CN | 109521621 | A | | 3/2019 | |
| CN | 110023081 | A | | 7/2019 | |
| CN | 106687317 | B | | 8/2019 | |
| CN | 209198826 | U | | 8/2019 | |
| EP | 1 439 600 | A2 | | 7/2004 | |
| JP | 2000-075317 | A | | 3/2000 | |
| JP | 3203546 | U | | 4/2016 | |
| KR | 10-2015-0003271 | A | | 1/2015 | |
| WO | WO-03-065084 | | * | 8/2003 | H04N 25/76 |

OTHER PUBLICATIONS

First Office Action as issued in Chinese Patent Application No. 201910930985.0, dated Jun. 12, 2023.

First Examination Report as issued in Indian Patent Application No. 202217010512, dated Mar. 13, 2026.

Notice of Preliminary Rejection as issued in Korean Patent Application No. 10-2022-7003464, dated Aug. 19, 2024.

* cited by examiner

GLASS WITH FUNCTION OF REGULATION IN SECTIONS INCLUDING A FUNCTIONAL COMPONENT AND A CONDUCTIVE ELEMENT, AND SYSTEM FOR REGULATING GLASS IN SECTIONS

CROSS-REFERENCE TO RELATED APPLICATIONS

This application is the U.S. National Stage of PCT/CN2020/118011, filed Sep. 27, 2020, which in turn claims priority to Chinese patent application number 201910930985.0 filed Sep. 29, 2019. The content of these applications are incorporated herein by reference in their entireties.

RELATED FIELD

The present disclosure relates to a smart glass and a control system thereof, and in particular, to a glass with a function of regulation in sections, a system for regulating a glass in sections and a method for regulating a glass in sections.

BACKGROUND

With the continuous development of technology, people expect that glass is capable of being more intelligent and functional, which requires glass to integrate more and more functions. For example, automobile glass with traditional functions cannot satisfy people's requirements, and people expect that automobile glass is capable of integrating other functions such as display, privacy, lighting, heating, communication, etc. In order to achieve the above functions, automobile glass generally includes corresponding functional layers. Taking a privacy glass as an example, the privacy glass is formed by placing a polymer dispersed liquid crystal layer (PDLC) component between two pieces of glass, and due to the characteristic of electro-induced transparency changing of PDLC, the transparency of the laminated glass can be adjusted by controlling parameters such as the voltage applied to the PDLC layer, so as to achieve the purpose of protecting privacy.

All of the above functions require an external power source to supply power. Therefore, the glass is required to include a corresponding electrical connection equipment to supply power to the functional layer. In the automobile industry, a conventional method is to firstly dispose a bus bar on the glass, by printing silver paste or welding metal foil tape, to be electrically connected to the functional layer, and then to weld a metal electrical connector (such as a metal terminal) to a junction with the bus bar through solder, and then to connect the metal electrical connector to an external power source through a power cord to provide power to the functional layer. However, since solder usually contains lead, this welding method may cause environmental problems. In addition, this electrical connection method is complicated in wiring and has low connection stability.

SUMMARY

According to the embodiments of the present disclosure, a glass with a function of regulation in sections, a system for regulating a glass in sections and a method for regulating a glass in sections are provided.

In a first aspect of the present disclosure, a glass with a function of regulation in sections is provided, and comprises a glass body comprising a glass substrate and a functional component attached to the glass substrate and divided into sections capable of being individually regulated; and a conductive component coupled to each section of the functional component;

wherein the conductive component comprises a flexible printed circuit and a conductive adhesive, the flexible printed circuit comprising a conductive trace electrically connected to each section of the functional component via the conductive adhesive to allow an individual regulation of each section of the functional component.

In some embodiments, the functional component comprises S sections, wherein S is an integer greater than 1.

In some embodiments, the functional component is divided, in X and Y directions, into $M_X \times N_Y$ sections capable of being individually regulated, wherein M and N are both integers, and M and N are not equal to 1 at the same time.

In some embodiments, the functional component comprises: an electrochromic component, an electro-induced transparency changing component, an electric lighting component, an electroluminescent display component, and an electric heating component.

In some embodiments, each section of the functional component comprises a functional element and an electrode element, and the electrode element is electrically connected to the conductive trace of the flexible printed circuit via the conductive adhesive.

In some embodiments, the electrode element is a transparent conductive metal-oxide film layer, a carbon nanotube film layer, graphene, a metal nanowire network or a copper network.

In some embodiments, the transparent conductive metal-oxide film layer is any one of an ITO layer, an AZO layer, an ATO layer, an IZO layer, a GZO layer, or a $LaNiO_3$ layer.

In some embodiments, the functional component is a polymer dispersed liquid crystal (PDLC) component, an electrochromic (EC) component, or a suspended particle device (SPD) component.

In some embodiments, the functional component is entirely or partially colored.

In some embodiments, the flexible printed circuit further comprises an interface coupled to an external power source and a control module, to allow the external power source to be electrically connected to each section of the functional component, and/or to allow the control module to regulate each section of the functional component.

In some embodiments, the interface comprises a connector or an interface circuit.

In some embodiments, the conductive adhesive is an isotropic conductive adhesive or an anisotropic conductive adhesive.

In some embodiments, the conductive adhesive is a pressure-sensitive adhesive (PSA), a thermo-sensitive adhesive (TSA), an anisotropic conductive film (ACF), or an anisotropic conductive paste (ACP).

In some embodiments, the glass is a laminated glass or a tempered glass.

In some embodiments, the glass is a vehicle glass, a building glass or a display glass.

In some embodiments, the glass is a vehicle glass being a windshield glass, a sunroof glass, a door glass, or a quarter window glass.

In a second aspect of the present disclosure, a system for regulating a glass in sections is provided, and comprises

- a glass unit being a glass with a function of regulation in sections according to any one of the above embodiments;
- a signal receiving module configured to receive an instruction and/or an environmental parameter corresponding to a target section of the functional component and to output a signal; and
- a control module coupled to the glass unit and the signal receiving module, and configured to regulate a function of the target section of the functional component in response to the signal from the signal receiving module.

In some embodiments, regulating the function of the target section of the functional component comprises turning on and off the function of the target section, and/or adjusting the strength of the function of the target section.

In some embodiments, the control module comprises a microcontroller, a storage unit, a voltage converter, and an input/output interface.

In some embodiments, the voltage converter comprises a direct current (DC-DC) converter or a direct current-alternating current (DC-AC) converter.

In some embodiments, the input/output interface comprises a bus transceiver comprising at least one of a controller area network (CAN) bus transceiver and a local interconnect network (LIN) bus transceiver.

In some embodiments, the signal receiving module comprises any one or more of a voice recognition device, a gesture recognition device, a fingerprint recognition device, an iris recognition device, a touch device, an operation button, an operation handle, a light sensor, a temperature sensor, and/or a humidity sensor.

According to a third embodiment of the present disclosure, a method for regulating a glass in sections is provided based on a system for regulating a glass in sections according to any one of the above embodiments, and comprises:

- receiving an instruction and/or an environmental parameter corresponding to the target section of the functional component and outputting a signal; and
- regulating a function of the target section of the functional component in response to the signal from the signal receiving module.

In some embodiments, regulating the function of the target section of the functional component comprises:

- applying a continuously-varying electrical signal to the target section, so as to continuously adjust the function of the target section;
- applying a stepwise-varying electrical signal to the target section, so as to stepwise adjust the function of the target section; or
- applying an electrical signal with a predetermined amplitude to the target section, so as to adjust the function of the target section to a predetermined level.

In some embodiments, the target sections are continuous sections or discontinuous sections.

It should be understood that the content of the invention is neither intended to determine the key or basic features of the embodiments of the present disclosure, nor to limit the scope of the present disclosure. Through the following description, other features of the present disclosure will become easy to understand.

BRIEF DESCRIPTION OF THE DRAWINGS

The present disclosure will be described in more detail with reference to the accompanying drawings hereinafter so as to better illustrate the object, features and advantages of the present disclosure.

DETAILED DESCRIPTION

With the continuous development of technology, people expect to integrate various functions such as privacy, lighting, display, etc. on the glass. All of these functions require electrical connection. However, conventional electrical connection such as welding process is not only complicated in the process, but also complicated in the formed circuits, resulting in a low product yield.

In view of this, the present disclosure provides a glass with a function of regulation in sections, a system for regulating a glass in sections and a method for regulating a glass in sections.

The present disclosure will be further described hereinafter with reference to several example embodiments so that those skilled in the art can fully understand the present disclosure. However, it should be understood that the description of these embodiments is only to enable those skilled in the art to better understand and thereby achieve the subject described herein, rather than to restrict in any forms the scope of protection, the applicability or the examples set forth in the claims. It should be understood that, without departing from the scope of protection of the present disclosure, various embodiments may dispense with, substitute for, or add various features as needed. In addition, features described in some embodiments may be combined in other embodiments.

In the present disclosure, unless otherwise explicitly specified and defined, the term "regulation in sections" should be interpreted in a broad sense, for example, it may be to turn on or off a function of each corresponding section, or to adjust the strength of the function of each corresponding section so that each corresponding section can be switched between two or more discontinuous states. For those skilled in the art, the specific meaning of the above terms in the embodiments of the present disclosure may be understood in the light of specific circumstances.

I. Glass with a Function of Regulation in Sections

An aspect of the present disclosure provides a glass with a function of regulation in sections. FIGS. 1 to 8 show specific features of the glass with a function of regulation in sections according to some embodiments of the present disclosure.

Figure 1:
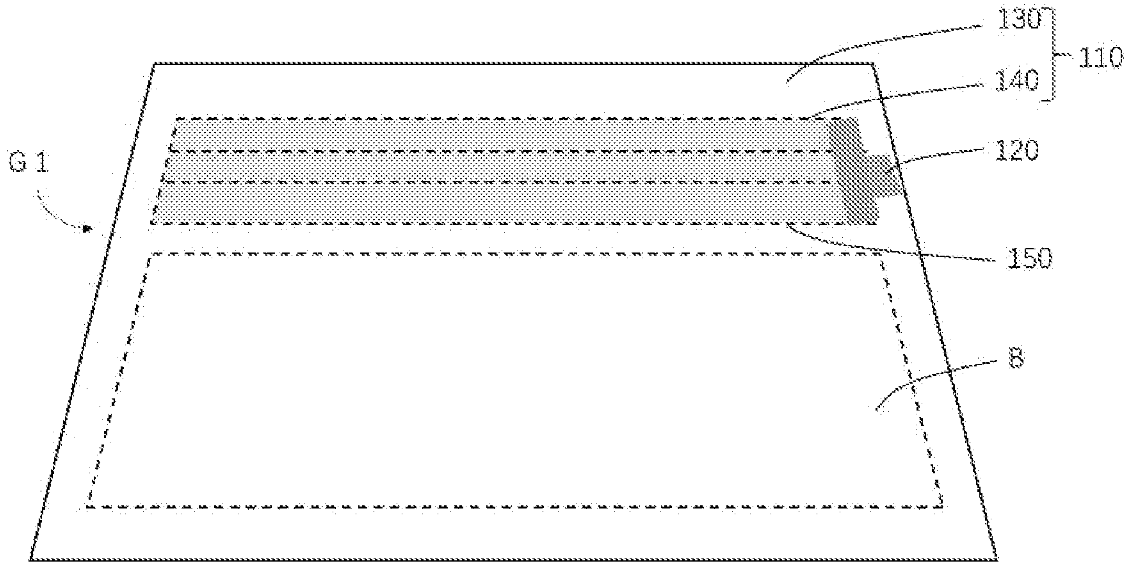
FIG. 1 shows a top view of a glass with a function of regulation in sections according to an embodiment of the present disclosure.
Figure 2:
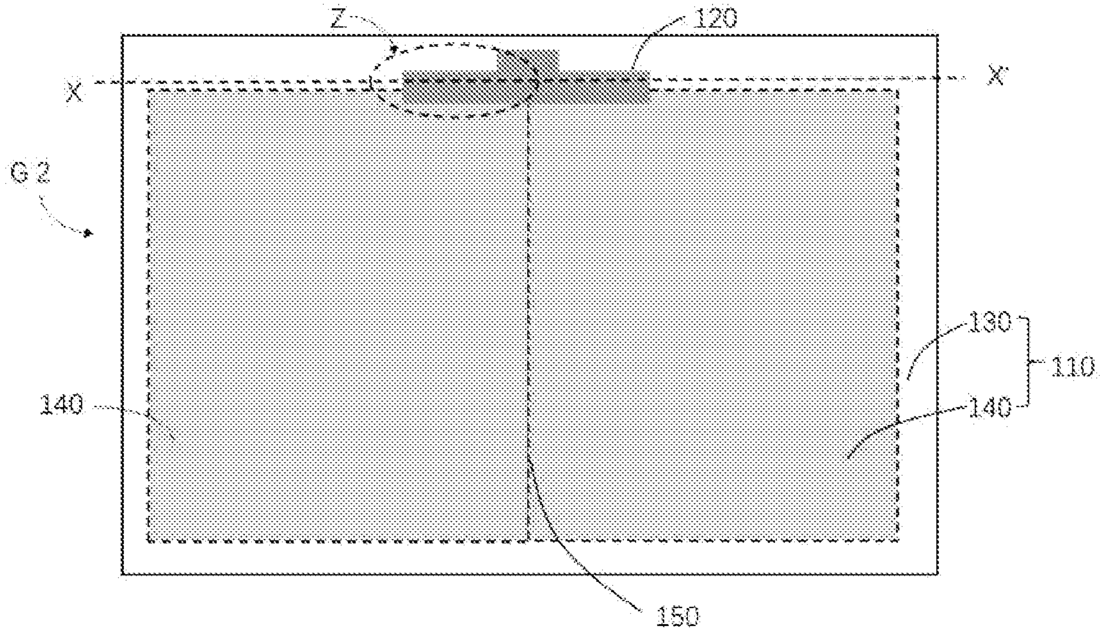
FIG. 2 shows a top view of a glass with a function of regulation in sections according to another embodiment of the present disclosure.
Figure 3:
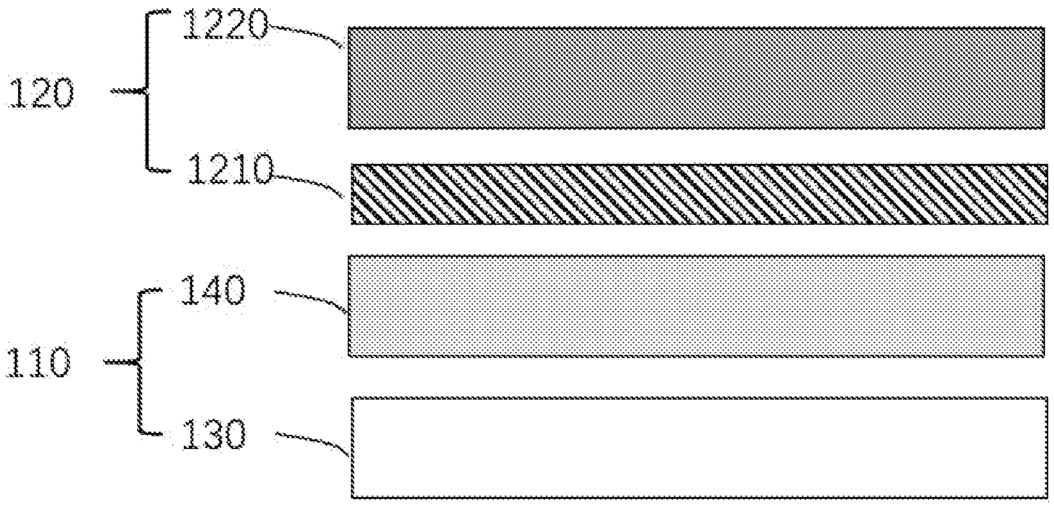
FIG. 3 shows a cross-sectional view of the Z area along the line X-X' in FIG. 2.
Figure 4:
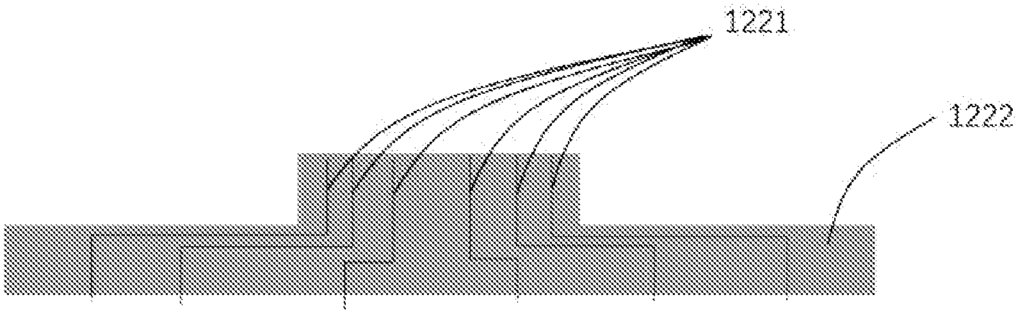
FIG. 4 shows a detailed view of a flexible printed circuit.

Specifically, FIG. 1 shows a windshield glass G1 with a function of regulation in sections according to an embodiment of the present disclosure. FIG. 2 shows a sunroof glass G2 with a function of regulation in sections according to another embodiment of the present disclosure. As shown in FIGS. 1 and 2, the glass with a function of regulation in sections according to the present disclosure includes a glass body 110 and a conductive component 120, wherein the glass body 110 comprises a glass substrate 130 and a functional component 140 attached to the glass substrate 130 and divided into sections capable of being individually regulated. Further, FIG. 3 shows a cross-sectional view of the glass in the Z area along the line X-X' shown in FIG. 2. As shown in FIG. 3, the conductive component 120 includes a flexible printed circuit 1220 and a conductive adhesive 1210. In addition, FIG. 4 shows a detailed view of the flexible printed circuit 1220. As shown in the figure, the flexible printed circuit 1220 includes a conductive trace 1221 and a substrate 1222, and the conductive trace 1221 is electrically connected to each section of the functional component 140 via the conductive adhesive 1210 to allow an individual regulation of each section of the functional component.

Since the conductive trace of the flexible printed circuit is respectively electrically connected to each section of the functional component of the glass, the glass with a function of regulation in sections according to the present disclosure allows people to arbitrarily adjust the function of a target section of the glass, which greatly enriches the functionality of the glass and satisfies people's expectations for more and more glass functions. In addition, this also gives more design space for the glass. For example, in the example of FIG. 1, the function of a sun shade can be obtained by adjusting the transparency of each section of the functional component. In the example of FIG. 2, the functions of privacy and sun shading can be achieved by adjusting the transparency of each section of the functional component.

In addition, the functional component of the glass is electrically connected to an external power source by the use of the flexible printed circuit and the conductive adhesive, which not only has a simpler process, but also has better connection stability and a higher product yield compared with the conventional welding connection.

Conductive Adhesive

Conductive adhesive is an adhesive which is conductive after curing. It is a polymer material that has both bonding and conductive functions. Compared with conventional welding process, the electrical connection achieved by conductive adhesive has the advantages of being environmentally friendly, simple in process, etc.

The present disclosure has no specific restrictions on the type of conductive adhesive. Those skilled in the art can select an appropriate conductive adhesive according to needs, such as an isotropic conductive adhesive (ICA) or an anisotropic conductive adhesive (ACA), specifically for example, a pressure-sensitive adhesive (PSA), a thermo-sensitive adhesive (TSA), an anisotropic conductive film (ACF), or an anisotropic conductive paste (ACP).

In some embodiments where the conductive adhesive is an isotropic conductive adhesive, the conductive adhesive is discontinuous between adjacent electrode elements of the functional component, which can prevent the adjacent electrode elements from being triggered by mistake. In the embodiment where the isotropic conductive adhesive is a conductive tape, the above arrangement can be achieved by discontinuous pasting (for example, the conductive tape is only arranged above the electrode elements). In the embodiment where the isotropic conductive adhesive is a conductive paste, the above arrangement can be achieved by discontinuous dispensing (for example, the conductive paste is only arranged above the electrode elements).

In some embodiments where the conductive adhesive is an anisotropic conductive adhesive, in addition to the same discontinuous arrangement as the above isotropic conductive adhesive, since the anisotropic conductive adhesive has the characteristic of being conductive in only one direction and non-conductive in other directions, this characteristic allows it to be continuously arranged. The continuous arrangement can simplify operation process, and can save working hours and manpower during mass production.

In some embodiments of the present disclosure, using the anisotropic conductive adhesive, such as an anisotropic conductive film or an anisotropic conductive paste, as the conductive adhesive can bring more advantageous effects. Specifically, the anisotropic conductive adhesive (ACA) is an adhesive composed of conductive particles, adhesives, and some additives, wherein the conductive particles make the ACA conductive and the adhesives make the ACA adhesive. In addition, the ACA also has the characteristic of being conductive only in the film thickness direction but non-conductive in the film surface direction. Therefore, compared with the isotropic conductive adhesive, the anisotropic conductive adhesive not only has bonding and conductive functions, but also has insulating function. When the functional component has more sections and the electrode elements of different sections are close to each other, this allows the anisotropic conductive adhesive not to cause a short circuit between adjacent electrode elements, and to prevent adjacent sections from being triggered by mistake. In addition, in some other embodiments of the present disclosure, the conductive adhesive is preferably the anisotropic conductive film (ACF). Compared with the anisotropic conductive paste (ACP), the ACF can be easily fixed to the conductive position of the functional component of the glass by peeling off a release paper, which simplifies the process.

Flexible Printed Circuit

As shown in FIG. 4, the flexible printed circuit 1220 includes a conductive trace 1221 and a substrate 1222, and the conductive trace 1221 is electrically connected to each section of the functional component 140 via the conductive adhesive 1210 to allow an individual regulation of each section of the functional component.

In some embodiments of the present disclosure, the flexible printed circuit (FPC) further includes an interface, coupled to an external power source and/or a control module, to allow the external power source to be electrically connected to each section of the functional component, and/or to allow the control module to regulate each section of the functional component. The interface includes a connector or an interface circuit. In some embodiments, the interface may be a golden finger for inserting a plug of the external power source. In this way, the external power module or the control module can be more conveniently connected to an external control module. Apparently, in some alternative embodiments, the interface may just be an interface circuit, and the external power module or the control module may be suitably coupled to the interface circuit. As an example, the interface circuit may refer to pins integrated or electrically connected to the conductive trace of the flexible printed circuit. This arrangement allows a better integration and a simpler structure.

Apparently, it should be understood that in addition to the above wired connection, the interface may refer to a wireless structure, that is, the interface can be wirelessly coupled to the external power module or the control module. For example, in some embodiments, the interface may use magnetic induction technology for wireless power transmission. In some alternative embodiments, the interface may transmit data for controlling the functional component through technologies such as Bluetooth and WiFi.

It should be understood that, those skilled in the art know how to ensure good adhesion between the flexible printed circuit, the functional component, and the conductive adhesive, so as to ensure electrical connection between them. For example, after the ACF is applied to the conductive position of the functional component, the ACF may be further hot-pressed with a hot-press to ensure good adhesion between the ACF and the functional component. Similarly, after the flexible printed circuit is applied to the ACF, the flexible printed circuit may also be further hot-pressed with a hot-press to ensure good adhesion between the flexible printed circuit, the conductive adhesive and the functional component.

Functional Component

In the present disclosure, the functional component refers to all functional components suitable for being regulated by electrical signals. For example, in some embodiments, the functional component includes a functional component capable of having at least one of the following functions: color change, transparency adjustment, lighting, display, heating, communication, and interaction between guest and host (guest host). In some other specific embodiments, the functional component includes: an electrochromic component, an electro-induced transparency changing component, an electric lighting component, an electroluminescent display component, and an electric heating component.

The functional components that achieve the above functions are known to those skilled in the art. For example, in embodiments of color change, transparency adjustment, etc., the functional component 140 may be a polymer dispersed liquid crystal (PDLC) component, an electrochromic (EC) component, or a suspended particle device (SPD) component. In some embodiments, in order to increase the aesthetic effect of the glass, the functional component may be entirely or partially colored.

The present disclosure has no specific restrictions on the positional distribution of the functional component in the glass, and those skilled in the art can make corresponding arrangements according to needs and relevant regulations. For example, in the example of the windshield glass shown in FIG. 1, in order to ensure the light transmittance of the central viewing area (i.e. the area B shown in FIG. 1), the functional component (such as a functional component that can change light transmittance) should avoid the area B.

In the embodiments of lighting, display and heating, the functional component 140 includes a functional element 1410, which not only has the functions of lighting, display or heating, but also has the function of electric conduction in itself. Therefore, the conductive trace of the flexible printed circuit can be directly electrically connected to each section of the functional component via the conductive adhesive to allow an individual regulation of each section of the functional component.

In the embodiment of color change, transparency adjustment, etc., the functional component 140 includes a functional element 1410 for changing color and adjusting transparency. In these embodiments, since the functional element 1410 is not conductive in itself, the functional component 140 further includes an electrode element 1420 electrically connected to the conductive trace of the flexible printed circuit via the conductive adhesive. The present disclosure has no specific restrictions on the shape of the electrode element 1420. For example, the electrode element may be layer-shaped, block-shaped or the like. In these embodiments, each section is individually regulated by changing the electrical signal applied to each section of the functional element 1410. In other embodiments, two electrode elements 1420, namely the first electrode element and the second electrode element, are respectively arranged on two sides of each functional element 1410, and each section is individually regulated by changing the electrical signal applied to two sides of each section of the functional element 1410. Specifically, by applying a voltage to the first electrode element and the second electrode element, an electric field is formed in the functional element 1410. Changing the voltage between the two electrode elements can change the electric field in the functional element 1410, thereby achieving the purpose of regulating the function of the functional element 1410. In addition, the conductive component 120 may be located on a same side (upper or lower side) of the functional component, or on two sides (upper and lower sides) of the functional component.

The present disclosure will be further described hereinafter by way of an example of a privacy glass with a function of regulation in sections.

Figure 5:
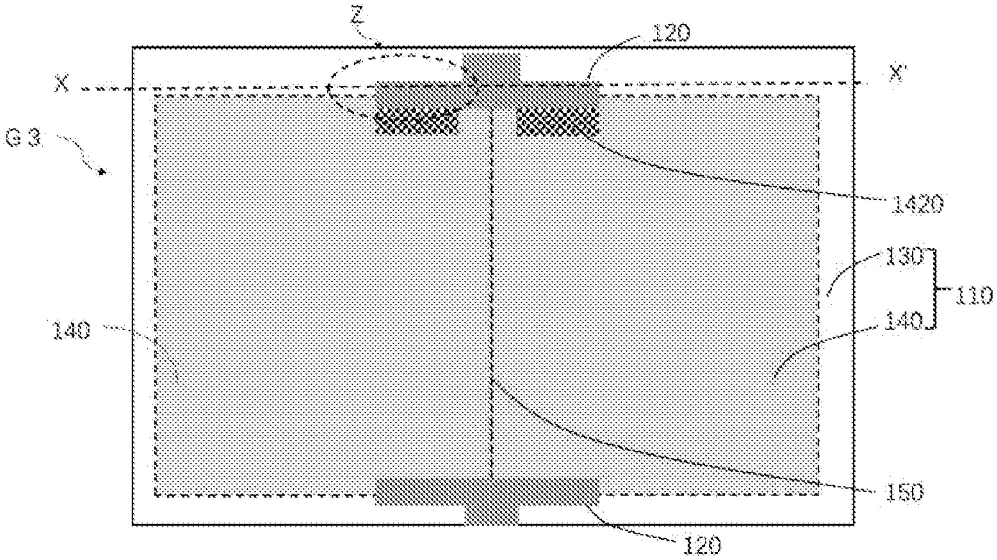
FIG. 5 shows a top view of a privacy glass with a function of regulation in sections according to an embodiment of the present disclosure.
Figure 6:
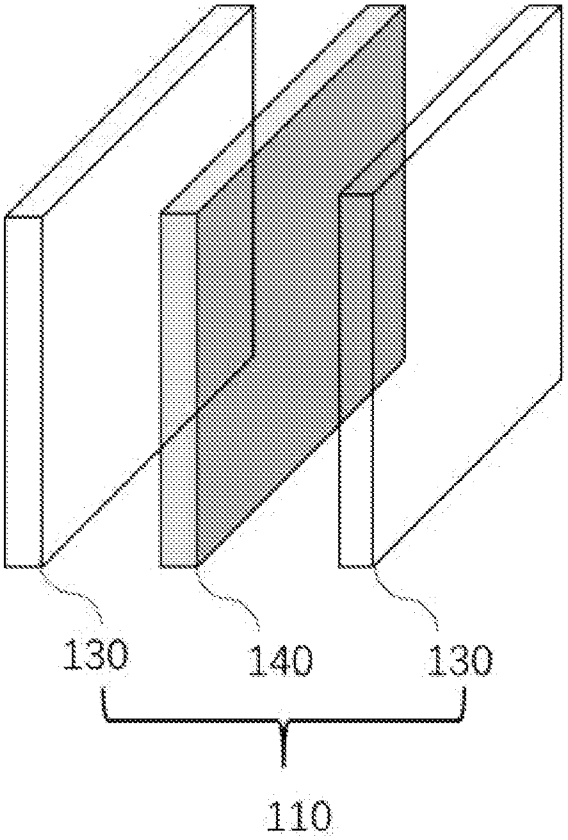
FIG. 6 shows a perspective view of the glass shown in FIG. 5.
Figure 7:
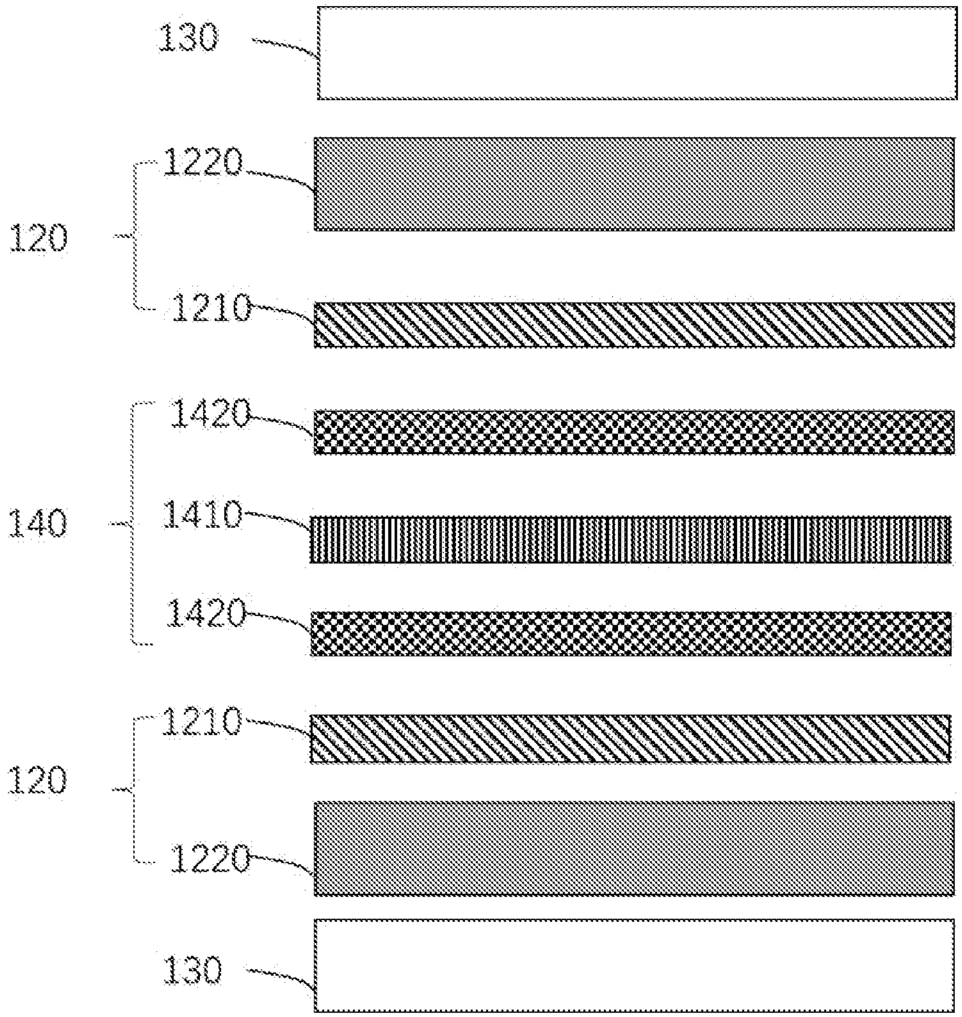
FIG. 7 shows a cross-sectional view of the Z area along the line X-X' in FIG. 5.

FIG. 5 shows a top view of a privacy glass G3 with a function of regulation in sections according to an embodiment of the present disclosure. FIG. 6 shows a perspective view of the glass shown in FIG. 5. FIG. 7 shows a cross-sectional view of the Z area along the line X-X' in FIG. 5. As shown in FIGS. 5 to 7, the privacy function is achieved by the polymer dispersed liquid crystal technology. The functional component 140 is a polymer dispersed liquid crystal (PDLC) component. The functional component 140 includes a functional element 1410 and an electrode element 1420, wherein the functional element 1410 is a polymer dispersed liquid crystal layer, and the electrode element 1420 is an ITO layer (indium tin oxide layer). The ITO layer is electrically connected to the conductive trace 1221 of the flexible printed circuit 1220 via the conductive adhesive 1210, and is electrically connected to an external power module.

It is known to those skilled in the art that the polymer dispersed liquid crystal (PDLC) layer includes a polymer layer and liquid crystal droplets dispersed in the polymer layer. The polymer layer is made of polymer materials. For example, the polymer layer is made of a material of which the refractive index matches the normal refractive index of the liquid crystal droplets. When there is no electric field, the liquid crystal droplets are disorderly dispersed in the polymer dispersed liquid crystal layer, thereby the polymer dispersed liquid crystal layer is in an opaque or frosted state. When a voltage is applied on two sides of the polymer dispersed liquid crystal layer to form an electric field therein, the liquid crystal droplets are orderly dispersed in the polymer layer, thereby the polymer dispersed liquid crystal layer is transparent.

It should be understood that the functions of the conventional polymer dispersed liquid crystal (PDLC) layer are described above. The present disclosure may adopt a reverse polymer dispersed liquid crystal (PDLC) layer. In other words, the reverse polymer dispersed liquid crystal layer in a transparent state when the power is turned off, and turns into a frosted state after the power is turned on. As a result, it is possible to protect a user's privacy while saving energy and protecting environment.

Further referring to FIGS. 6 and 7, the above electrode elements 1420 are a first ITO layer and a second ITO layer attached to two sides of the polymer dispersed liquid crystal layer 1410, that is, the first ITO layer and the second ITO layer serve as electrode elements to drive the polymer dispersed liquid crystal layer. In addition, a PET layer serving as a carrier layer/protective layer (not shown) is provided on the respective side of the first ITO layer and the second ITO layer close to the glass, and an adhesive layer (not shown) is further provided between the two (upper and lower) glass substrates 130 and the functional component 140 and/or the conductive components 120. The adhesive layer is made of, for example, polyvinyl butyral (PVB) or ethylene vinyl acetate (EVA). These layers can be completely evacuated through an autoclave to completely adhere to each other.

Further referring to FIG. 5, the conductive components 120 are respectively located on the upper and lower sides of the functional component. It is conceivable to those skilled in the art that, the two conductive components may be both arranged on the upper side or the lower side of the functional component.

Apparently, it should be understood that, the embodiments of the functional component including the above elements are merely exemplary and are not intended to limit the scope of protection of the present disclosure. Any other suitable devices are applicable.

The present disclosure has no specific restrictions on the material of the electrode element 1420, and those skilled in the art can make a selection according to the specific characteristics of the functional element. In some preferred embodiments of the present disclosure, the electrode element is a transparent conductive metal-oxide film layer, a carbon nanotube film layer, a graphene layer, a metal nanowire network or a copper network. Further, in some other preferred embodiments of the present disclosure, the transparent conductive metal-oxide film layer is any one of an ITO layer, an AZO layer, an ATO layer, an IZO layer, a GZO layer, or a $LaNiO_3$ layer.

In the present disclosure, the functional component 140 has S sections, wherein S is an integer greater than 1. Specifically, in some embodiments, the functional component 140 is divided, in X and Y directions, into $M_X \times N_Y$ sections capable of being individually regulated, wherein M and N are both integers, and M and N are not equal to 1 at the same time.

In the embodiment where the functional element 1410 has a conductive function in itself, the functional element 1410 can be divided into multiple individual sections by forming insulating lines 150 on the functional element 1410 by laser etching, without affecting the function of the functional element 1410. For example, in the embodiment of a glass with a function of regulating heating in sections, the ITO layer can be used as a heating element and a conductive element in itself. Therefore, the ITO layer can be divided into multiple individual sections by forming insulating lines 150 on the ITO layer by laser etching.

In the embodiment where the functional element 1410 is not conductive in itself and the functional component 140 additionally includes the electrode element, the electrode element 1420 can be divided into multiple individual sections by forming insulating lines 150 on the electrode element 1420 by laser etching. For example, in the above embodiment of the privacy glass with a function of regulation in sections, since the PDLC layer is not conductive in itself and the ITO layers on the front and back sides of the PDLC layer are conductive, the ITO layer can be divided into multiple individual sections by forming insulating lines 150 on the ITO layer by laser etching. Further, since the dispersed liquid crystal in the PDLC film has dielectric anisotropy, in the embodiment of the PDLC, the PDLC can be regulated in sections by laser etching on the ITO on one side of the PDLC layer.

Figure 8A:
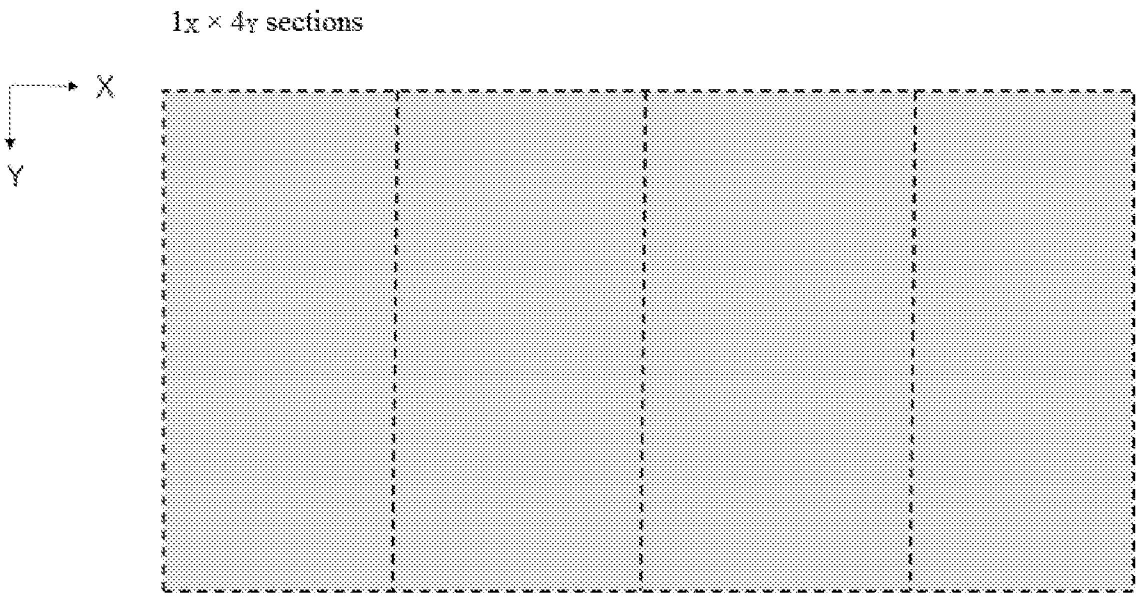
FIGS. 8*a* to 8*c* show schematic views of the division of sections of the functional component according to the present disclosure.
Figure 8B:
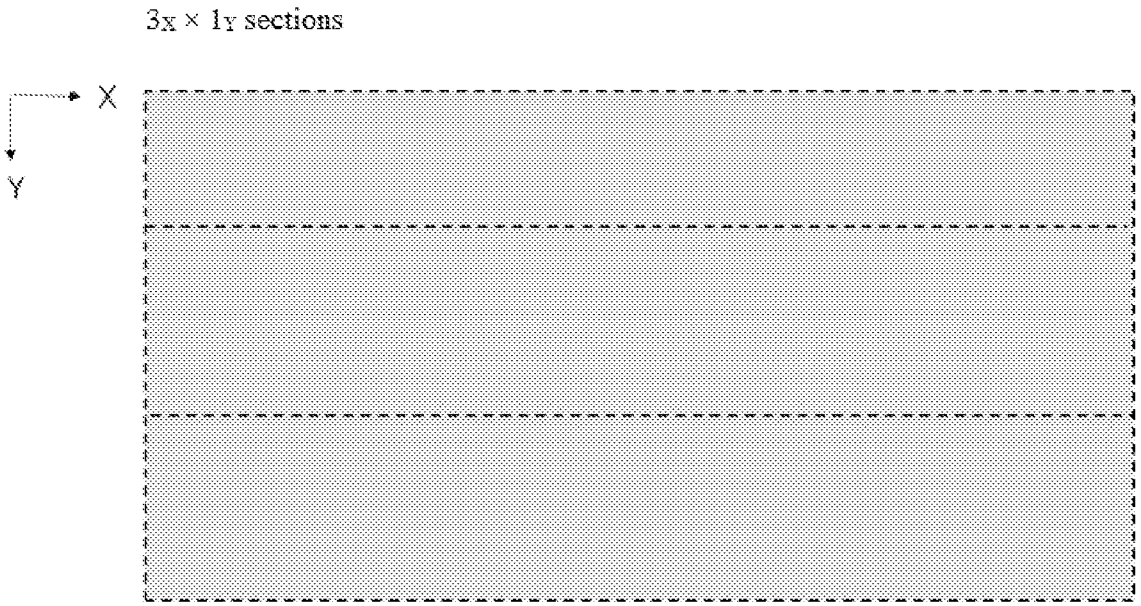
Figure 8C:
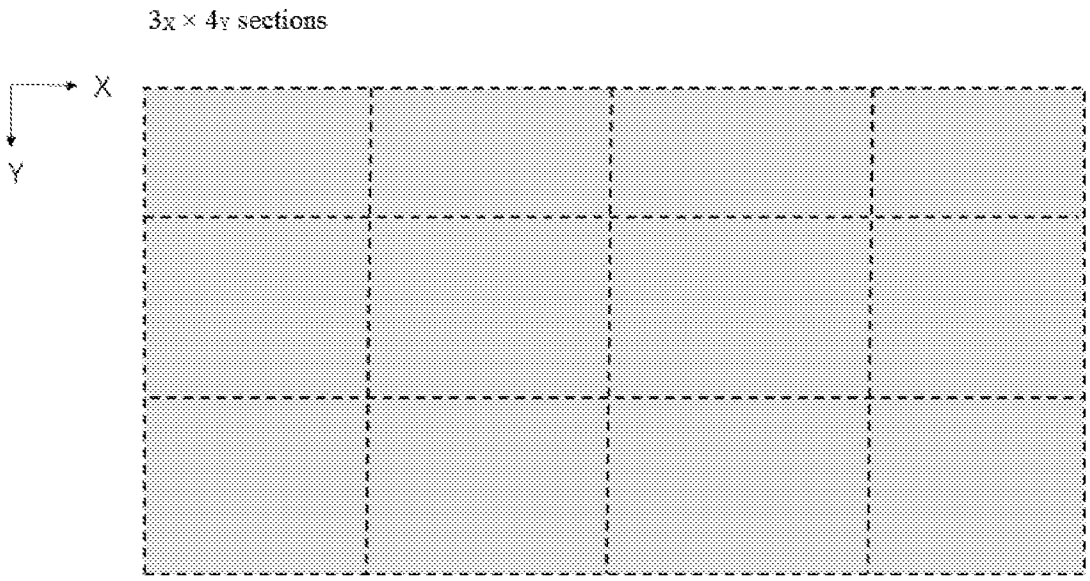

As shown in FIGS. 8*a* to 8*c*, $1_X \times 4_Y$ sections (shown in FIG. 8*a*), $3_X \times 1_Y$ sections (shown in FIG. 8*b*) or $3_X \times 4_Y$ sections (shown in FIG. 8*c*) can be obtained.

Apparently, it should be understood that, the above embodiments regarding the division of sections of the functional component are merely exemplary and are not intended to limit the scope of protection of the present disclosure. Any other suitable divisions are applicable. For example, according to needs, those skilled in the art can perform laser etching on the above functional element or the above electrode element to obtain arbitrary patterns or shapes. In addition, FIGS. 8*a* to 8*c* only schematically show the division of sections and the positions of insulating lines. Those skilled in the art know how to appropriately arrange the insulating lines 150 to ensure that each section can be individually electrically connected to the conductive trace in the flexible printed circuit.

As will be described in detail below, each section of the above functional component can be adjusted according to instructions and/or environmental parameters. In some embodiments, all sections of the functional component can be adjusted. In some other embodiments, only a part of the sections of the functional component can be adjusted. Apparently, the sections to be regulated may be continuous sections or discontinuous sections.

In some embodiments, according to needs, the function of each section of the functional component may be turned on and off, and/or the strength of the function of each section may be adjusted. For adjusting the strength of the function of each section, the user can perform continuous adjustment, stepwise adjustment, and/or set a specific value for the functional characteristic of each section of the functional component.

For example, in the embodiment of a PDLC glass, the user can choose to turn on or off the power of any section according to needs to control the corresponding section to switch between a fully transparent state and a fully frosted state. In addition, the user can further adjust the degree of transparency (also called as the degree of frosting) of any section according to needs. For example, a part of the sections are transparent and a part of the sections are frosted. In the embodiment of an illuminating glass, the user can turn on or off the lighting function of any section of the glass according to needs. In addition, the user can adjust the intensity of light of any section, and even select the type of required light color according to needs.

INDUSTRIAL APPLICATION

The present disclosure has no specific restrictions on specific industrial applications of the above glass with a function of regulation in sections.

In some embodiments of the present disclosure, the above glass may be a laminated glass or a tempered glass. In the embodiment of a laminated glass, the functional component may be a PDLC component, and the electrode element may be an ITO layer. In the embodiment of a tempered glass, the functional component may be a display film, the electrode element may be an ITO layer, and the display film may be attached to one side of the glass.

In some other embodiments of the present disclosure, the glass may be a vehicle glass, a building glass or a display glass. The vehicle includes automobiles, trains, airplanes, etc.

In some other embodiments of the present disclosure, the glass may be a windshield glass, a sunroof glass, a door glass, or a quarter window glass.

II. System for Regulating a Glass in Sections

Figure 9:
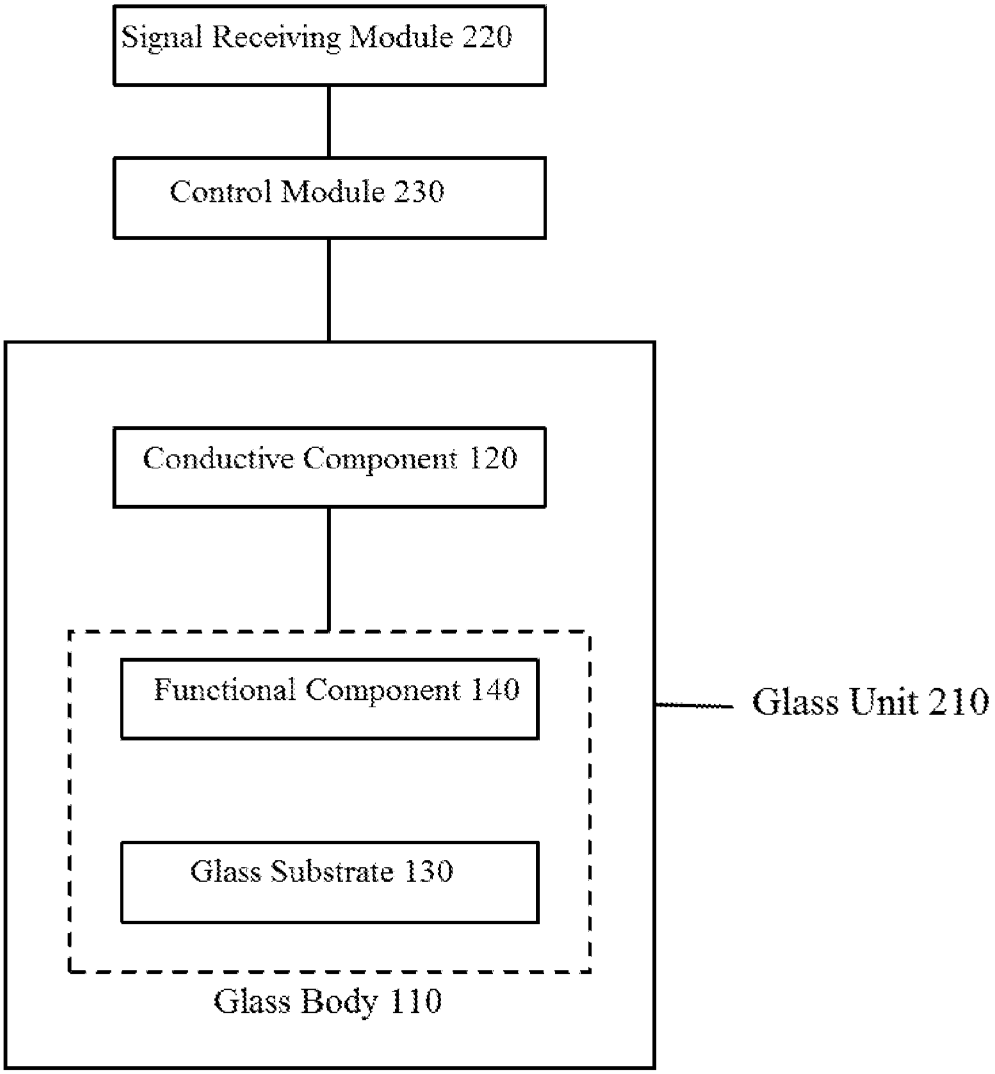
FIG. 9 shows a system for regulating a glass in sections according to an embodiment of the present disclosure.

Another aspect of the present disclosure provides a system for regulating a glass in sections. FIG. 9 shows a system for regulating a glass in sections according to an embodiment of the present disclosure.

As shown in FIG. 9, the system for regulating a glass in sections includes:

- a glass unit (210), which is the glass with a function of regulation in sections according to the above description;
- a signal receiving module (220) configured to receive an instruction and/or an environmental parameter corresponding to a target section of the functional component and to output a signal; and
- a control module (230) coupled to the glass unit and the signal receiving module, and configured to regulate a function of the target section of the functional component in response to the signal from the signal receiving module.

Glass Unit

As described above, the glass unit (210) is the glass with a function of regulation in sections as described above (see the section I. Glass with a Function of Regulation in Sections), which will not be repeated here.

It should be understood that the system for regulating a glass in sections according to the present disclosure further includes a device for providing power to it. In some embodiments, the device is an external power source, such as an automobile power source, which has an interface and is coupled to the signal receiving module 220, the control module 230, and/or the glass unit 210 through the interface to supply power to the system for regulating a glass in sections. In some embodiments, the interface may be a connector or an interface circuit. In some embodiments, the interface may be a two-pin socket. In some alternative embodiments, the interface may just be an interface circuit, and the power module may be suitably coupled to the signal receiving module, the control module, and/or the glass unit. This arrangement allows a better integration and a simpler structure.

Signal Receiving Module

As described above, the signal receiving module (220) is configured to receive an instruction and/or an environmental parameter corresponding to a target section of the functional component and to output a signal. Specifically, the above instruction refers to an instruction issued by the user, for example, an instruction issued by a passenger in an automobile or an instruction issued by another person.

It should be noted that the target section of the functional component refers to a section to be regulated in the functional component corresponding to the instruction and/or the environmental parameter. In some embodiments, the section to be regulated may include all sections of the functional component. In some other embodiments, the section to be regulated may include only a part of the sections of the functional component. Apparently, the sections to be regulated may be continuous sections or discontinuous sections.

In order to achieve the above configuration, the signal receiving module can receive an instruction and/or an environmental parameter on the one hand, and can output a signal on the other hand. The present disclosure has no specific restrictions on the device type of the signal receiving module 220, as long as it can achieve the above two main functions.

The signal receiving module 220 may be integrated into the glass body 110, or may be independently provided and coupled to the glass body 110 through an interface. The signal receiving module 220 may include an interaction unit and/or a detection unit, wherein the interaction unit is configured to receive an instruction issued by a passenger, and the detection unit is configured to receive an environmental parameter. In some embodiments, the environmental parameter includes optical, temperature, and humidity parameters.

In some embodiments of automobile glass, the signal receiving module 220 is an automobile sensor or other signal receiving device in the automobile, so as to recognize an instruction (issued by the user) and an environmental parameter. In addition, the signal receiving module 220 is coupled to the control module 20 through an interface, so as to output a signal to the control module 240. All of the above interfaces may be wired interfaces and/or wireless signal transmission devices (for example, Bluetooth, Wi-Fi, etc.).

In some embodiments, in order to recognize an instruction, the interaction unit includes any one or more of the followings: a voice recognition device, a gesture recognition device, a fingerprint recognition device, an iris recognition device, a touch device, an operation button, and/or an operation handle. The detection unit includes any one or more of the followings: a light sensor, a temperature sensor, a humidity sensor.

Apparently, it should be understood that, the embodiments of the signal receiving module 220 being the above various devices are merely exemplary and are not intended to limit the scope of protection of the present disclosure. Any other suitable devices are applicable. For example, in an embodiment where the signal receiving module 220 is a touch device, the touch device may adopt various touch technologies, such as, but not limited to, capacitive touch, resistive touch, surface acoustic wave touch, or infrared touch.

The touch device receives a touch gesture and allows the control module to provide a light-adjusting signal according to the touch gesture. For example, the touch device receives a sliding gesture in the horizontal direction, wherein the gesture of sliding to the left indicates to increase the transparency of the glass, and the gesture of sliding to the right indicates to decrease the transparency of the glass. For example, the touch device may also receive a sliding gesture in the vertical direction, wherein the gesture of sliding upward indicates to increase the transparency of the glass, and the gesture of sliding downward indicates to decrease the transparency of the glass. It should be understood that the touch gesture has flexible and various forms, and the touch gesture may correspond to a light-adjusting instruction represented by the touch gesture in various suitable ways, which are not limited to the above.

Control Module

As described above, the control module (230) is coupled to the glass unit and the signal receiving module, and is configured to regulate a function of the target section of the functional component in response to the signal from the signal receiving module 220.

As shown in FIG. 9, the control module 230 performs comparisons and calculations according to the signal from the signal receiving module 220, and converts the calculation result into a control signal to control the electrical signal applied to the functional component, and the function of the target section of the functional component is regulated by adjusting the electrical signal applied to the functional component.

In some embodiments, the control module 230 may be integrated into the glass body 110, or may be independently provided and coupled to the glass body 110 through an interface.

In some embodiments, regulating the function of the target section of the functional component includes turning on and off the function of the target section, and/or adjusting the strength of the function of the target section. Therefore, the user can freely turn on and off the function of the target section and/or adjust the strength of the function of the target section according to needs. Adjusting the strength of the function of the target section includes performing continuous adjustment, stepwise adjustment, and/or set a specific value for the functional characteristic of the target section.

The present disclosure has no specific restrictions on the implementation of the above regulation, wherein turning on and off the function of the target section can be achieved by turning on and off the electrical connection of the target section; adjusting the strength of the function of the target section can be achieved by applying a varying electrical signal to the functional component 140. Specifically, it can be achieved by applying a continuously varying electrical signal (for example, an electrical signal with a continuously varying voltage amplitude) to the functional component 140, or by applying a stepwise varying electrical signal (for example, an electrical signal with a stepwise varying voltage amplitude) to the functional component 140, or by applying an electrical signal with a predetermined value (for example, an electrical signal with a predetermined value corresponding to a predetermined level) to the functional component 140.

In the embodiment of a PDLC glass, the user can choose to turn on or off the power of any section according to needs to control the corresponding section to switch between a fully transparent state and a fully frosted state. In addition, the user can further adjust the degree of transparency (also called as the degree of frosting) of any section according to needs. For example, a part of the sections are transparent and a part of the sections are frosted. In the embodiment of an illuminating glass, the user can turn on or off the lighting function of any section of the glass according to needs. In addition, the user can adjust the intensity of light of any section, and even select the type of required light color according to needs.

In some embodiments, in order to complete the control to the glass unit, a varying electrical signal is required to be applied to the functional component. Therefore, the control module includes a microcontroller, a direct current (DC-DC) converter or a direct current-alternating current (DC-AC) converter or a direct current-variable direct current converter, and an input/output interface (I/O). The control module can be coupled to the direct current power supplied by a power supply device such as an automobile power source. According to the signal from the signal receiving module, the microcontroller performs comparisons and calculations, and converts the calculation result into a control signal, so as to achieve the expected function of the functional component by converting an input voltage to a required voltage through the DC-DC converter and outputting the signal to the functional component.

In addition, the control module further includes a storage unit. By storing a pre-written inherent program in the storage unit, the control module can compare the signal from the signal receiving module with the inherent program and perform calculations, and then convert the calculation result into a control signal to control the electrical signal applied to the functional component, and the function of the target section of the functional component is regulated by adjusting the electrical signal applied to the functional component. For example, in the embodiment where the signal from the signal receiving module is an environmental parameter, according to the signal from the signal receiving module, such as an optical parameter, when the optical parameter is higher than a preset threshold, the microcontroller controls, according to the pre-written inherent program, the DC-DC converter to convert the input voltage value into a voltage value that enables the PDLC layer to achieve the expected transparency to control the PDLC layer. In the embodiment where the signal from the signal receiving module is an instruction issued by the user, according to the signal from the signal receiving module, such as an instruction from the user for decreasing the transparency of the glass, the microcontroller controls, according to the pre-written inherent program, the DC-DC converter to convert the input voltage value into a voltage value that can decrease the transparency of the PDLC layer to control the PDLC layer, so as to achieve the expected function.

Apparently, it should be understood that, the embodiments regarding the DC-DC converter are merely exemplary and are not intended to limit the scope of protection of the present disclosure. Any other suitable converters are applicable. For example, in some alternative embodiments, the control module may include a DC-AC converter or a direct current-variable direct current converter. In some alternative embodiments, when the input is an alternating current (AC), the control module may include an AC-DC converter or an AC-AC converter.

In some embodiments, the above input/output interface (I/O) includes a bus transceiver for transmitting a signal such as a control signal or a sensor signal. For example, in some embodiments of automobile glass, the bus transceiver may include a controller area network (CAN) bus transceiver and a local interconnect network (LIN) bus transceiver used in an automobile. This arrangement enables the control module to be coupled to the control system of the automobile via the CAN bus and/or the LIN bus, thereby achieving more functions. For example, the user can control the transparency of the glass with speech by use of the control system of the automobile.

Apparently, it should be understood that, the above embodiments of the control module including the components are merely exemplary rather than exhaustive, and are not intended to limit the scope of protection of the present disclosure. Any other suitable components or modules are applicable.

III. Method for Regulating a Glass in Sections

Figure 10:
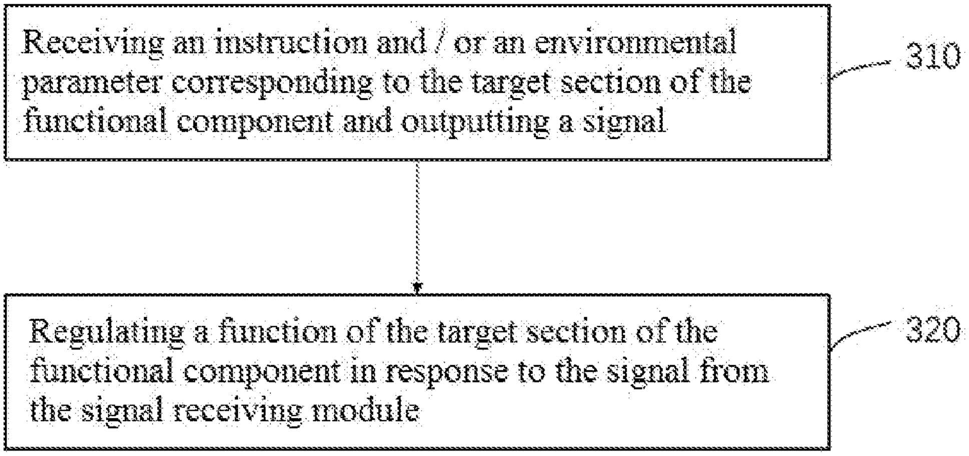
FIG. 10 shows a flow chart of a method for regulating a glass in sections according to an embodiment of the present disclosure.

Another aspect of the present disclosure provides a method for regulating a glass in sections. FIG. 10 is a flow chart of a method for regulating a glass in sections according to an embodiment of the present disclosure. This method can be executed at the control module 230 in the system for regulating a glass in sections as shown in FIG. 9.

As shown in FIG. 10, based on the above system for regulating a glass in sections, the method for regulating a glass in sections includes the following steps:

Step 310, receiving an instruction and/or an environmental parameter corresponding to the target section of the functional component and outputting a signal; and Step 320, regulating a function of the target section of the functional component in response to the signal from the signal receiving module.

In some embodiments, the step 320 is: turning on and off the function of the target section, and/or adjusting the strength of the function of the target section in response to the signal from the signal receiving module. Some embodiments of turning on and off the function of the target section and/or adjusting the strength of the function of the target section have been described above (see section II. System for Regulating a Glass in Sections), which will not be repeated here.

In some embodiments, according to the signal from the signal receiving module, the corresponding section of the functional component can be directly turned on and/or off, and/or can be directly turned on with a certain intensity (such as transparency and light intensity) according to a predetermined setting. In an example where the signal receiving module is a capacitive touch device, each section of the functional component can be directly turned on and/or turned off after a change in capacitance of the section is detected, or can be directly turned on with a preset intensity such as transparency.

In some other embodiments, the signal receiving module 220 outputs a signal to the control module 230 after receiving an instruction and/or an environmental parameter corresponding to the target section of the functional component. The control module 230 receives the signal from the signal receiving module 220, and performs comparisons and calculations based on the signal, and then converts the calculation result into a control signal to control the electrical signal applied to the functional component, and the function of the target section of the functional component is regulated by adjusting the electrical signal applied to the functional component.

In some specific embodiments, in response to the signal from the signal receiving module, the control module applies a continuously-varying electrical signal to the section, so as to continuously adjust the function of the target section; or applies a stepwise-varying electrical signal to the target section, so as to stepwise adjust the function of the target section; or applies an electrical signal with a predetermined amplitude to the target section, so as to adjust the function of the target section to a predetermined level. In addition, these target sections may be continuous sections or discontinuous sections.

Apparently, it should be understood that, the above embodiments regarding the method for regulating in sections including the steps are merely exemplary rather than exhaustive, and are not intended to limit the scope of protection of the present disclosure. Any other suitable step adjustments are applicable.

Although specific embodiments of the present disclosure have been described above, those skilled in the art should understand that this description is merely illustrative and the scope of protection of the present disclosure is defined by the appended claims. Those skilled in the art can make various modifications, equivalent substitutions or improvements to these embodiments without departing from the principle and essence of the present disclosure, and these modifications, equivalent substitutions or improvements fall within the scope of protection of the present disclosure.

The invention claimed is:

1. A glass with a function of regulation in sections, comprising:

a glass body comprising a glass substrate and a functional component attached to the glass substrate and divided into sections capable of being individually regulated; and a conductive component coupled to each section of the functional component, wherein the functional component comprises one of an electrochromic component, an electro-induced transparency changing component, an electric lighting component, an electroluminescent display component, and an electric heating component, wherein the functional component is entirely or partially colored, wherein the conductive component comprises a flexible printed circuit and a conductive adhesive, the flexible printed circuit comprising a conductive trace electrically connected to each section of the functional component via the conductive adhesive to allow an individual regulation of each section of the functional component, and wherein the flexible printed circuit further comprises an interface coupled to an external power source and a control module, to allow the external power source to be electrically connected to each section of the functional component, and/or to allow the control module to regulate each section of the functional component.

2. The glass with a function of regulation in sections according to claim 1, wherein the functional component comprises S sections, and wherein S is an integer greater than 1.

3. The glass with a function of regulation in sections according to claim 2, wherein the functional component is divided, in X and Y directions, into $M_X \times N_Y$ sections capable of being individually regulated, and wherein M and N are both integers, and M and N are not equal to 1 at the same time.

4. The glass with a function of regulation in sections according to claim 1, wherein each section of the functional component comprises a functional element and an electrode element, the electrode element being electrically connected to the conductive trace of the flexible printed circuit via the conductive adhesive.

5. The glass with a function of regulation in sections according to claim 4, wherein the electrode element is a transparent conductive metal-oxide film layer, a carbon nanotube film layer, graphene, a metal nanowire network or a copper network.

6. The glass with a function of regulation in sections according to claim 5, wherein the transparent conductive metal-oxide film layer is any one of an ITO layer, an AZO layer, an ATO layer, an IZO layer, a GZO layer, or a $LaNiO_3$ layer.

7. The glass with a function of regulation in sections according to claim 1, wherein the functional component is a polymer dispersed liquid crystal (PDLC) component, an electrochromic (EC) component, or a suspended particle device (SPD) component.

8. The glass with a function of regulation in sections according to claim 1, wherein the interface comprises a connector or an interface circuit.

9. The glass with a function of regulation in sections according to claim 1, wherein the conductive adhesive is an isotropic conductive adhesive or an anisotropic conductive adhesive.

10. The glass with a function of regulation in sections according to claim 1, wherein the conductive adhesive is a pressure-sensitive adhesive (PSA), a thermo-sensitive adhesive (TSA), an anisotropic conductive film (ACF), or an anisotropic conductive paste (ACP).

11. The glass with a function of regulation in sections according to claim 1, wherein the glass is a laminated glass or a tempered glass.

12. The glass with a function of regulation in sections according to claim 1, wherein the glass is a vehicle glass, a building glass or a display glass.

13. The glass with a function of regulation in sections according to claim 1, wherein the glass is a vehicle glass being a windshield glass, a sunroof glass, a door glass, or a quarter window glass.

14. A system for regulating a glass in sections, comprising:

a glass unit being a glass with a function of regulation in sections according to claim 1;

a signal receiving module configured to receive an instruction and/or an environmental parameter corresponding to a target section of the functional component and to output a signal, wherein the control module is coupled to the signal receiving module, and configured to regulate a function of the target section of the functional component in response to the signal from the signal receiving module.

15. The system for regulating a glass in sections according to claim 14, wherein regulating the function of the target section of the functional component comprises turning on and off the function of the target section, and/or adjusting the strength of the function of the target section.

16. The system for regulating a glass in sections according to claim 15, wherein the control module comprises a microcontroller, a storage unit, a voltage converter, and an input/output interface.

17. The system for regulating a glass in sections according to claim 16, wherein the voltage converter comprises a direct current (DC-DC) converter or a direct current-alternating current (DC-AC) converter.

18. The system for regulating a glass in sections according to claim 16, wherein the input/output interface comprises a bus transceiver comprising at least one of a controller area network (CAN) bus transceiver and a local interconnect network (LIN) bus transceiver.

19. The system for regulating a glass in sections according to claim 14, wherein the signal receiving module comprises any one or more of a voice recognition device, a gesture recognition device, a fingerprint recognition device, an iris recognition device, a touch device, an operation button, an operation handle, a light sensor, a temperature sensor, and/or a humidity sensor.

20. A method for regulating a glass in sections, based on a system for regulating a glass in sections according to claim 14, and comprising:

receiving an instruction and/or an environmental parameter corresponding to the target section of the functional component and outputting a signal; and regulating a function of the target section of the functional component in response to the signal from the signal receiving module.

21. The method for regulating a glass in sections according to claim 20, wherein regulating the function of the target section of the functional component comprises:

applying a continuously-varying electrical signal to the target section, so as to continuously adjust the function of the target section;

applying a stepwise-varying electrical signal to the target section, so as to stepwise adjust the function of the target section; or applying an electrical signal with a predetermined amplitude to the target section, so as to adjust the function of the target section to a predetermined level.

22. The method for regulating a glass in sections according to claim 20, wherein the target sections are continuous sections or discontinuous sections.

* * * * *